| United States Patent [19] | [11] | 4,449,601 |
|---|---|---|
| Adams | [45] | May 22, 1984 |

[54] POWER-ASSISTED STEERING GEAR ASSEMBLY

[75] Inventor: Frederick J. Adams, Clevedon, England

[73] Assignee: Cam Gears Limited, England

[21] Appl. No.: 382,816

[22] Filed: May 28, 1982

[30] Foreign Application Priority Data

Jun. 3, 1981 [GB] United Kingdom ............... 8117028

[51] Int. Cl.$^3$ ............................................. B62D 5/08
[52] U.S. Cl. ................................. 180/148; 91/375 A; 137/625.24
[58] Field of Search ............. 180/148, 132; 91/375 R, 91/467, 466, 462, 375 A; 137/625.24

[56] References Cited

U.S. PATENT DOCUMENTS 4,325,447  4/1982  Dauvergne .................. 180/148

FOREIGN PATENT DOCUMENTS 1588593  4/1981  United Kingdom .................. 180/148

*Primary Examiner*—John A. Pekar
*Attorney, Agent, or Firm*—Yount & Tarolli

[57] ABSTRACT

A power-assisted steering gear assembly in which displacement of a driven member or rack bar (1) on rotation of a driving member or pinion (3) through a steering input (4) is power assisted by means to which fluid pressure is supplied by a rotary valve (6) located on the axial side of the pinion remote from the steering input. One of the valve members (9) of the rotary valve is rotationally rigid with the pinion and the other of the valve members (8) is rotationally rigid with the steering input by way of a torsionally rigid transmission member (14) which extends axially through the pinion, the pinion and the steering input being resiliently coupled by a C-spring (19). A lost motion device (38) may be provided to relieve overstressing of the C-spring. Adjustment means (28) permits selective relative angular adjustment of the steering input and the transmission member without relative rotation of the valve members.

8 Claims, 3 Drawing Figures

POWER-ASSISTED STEERING GEAR ASSEMBLY

TECHNICAL FIELD

This invention relates to a power-assisted steering gear assembly and is particularly concerned with such an assembly in which the valve means for controlling the flow of pressurised fluid to the power-assistance means is located at a position remote from a steering input of the assembly.

BACKGROUND ART

With the advent transverse engines and front wheel drives in motor vehicles, various problems have arisen, one of which is that there is less space available in the area within the engine compartment that has in the past been reserved for the steering gear assembly. One solution to this problem has been to move the steering gear rearwardly, but this can mean that in a vehicle fitted with power-assisted steering gear, the hydraulic control valve is located within the cab or passenger compartment. This arrangement has clear disadvantages and it has been proposed to provide axial-displacement hydraulic control valves at a position remote from the steering input to the steering gear assembly. Thus, in the case of a rack and pinion gear, it has been proposed to locate the power assistance axially displaceable control valve on the side of the pinion remote from the steering input with the valve being controlled by a rod which is axially displaceable in response to rotation of the steering input.

This is an advantageous technique for providing additional space rearwardly of the rack bar, but heretofore has not been applicable to power-assisted steering gear assemblies utilising rotary hydraulic control valves. It is established practice that in order to provide the relative rotational movement of the two valve members of a rotary valve, a torsin bar is used and this has the additional advantage of providing the centering effort for the two valve members when there is no rotational movement at the steering input. However, if the torsion bar is extended to accommodate a rotary valve arrangement located at a position remote from the steering input, it has been found that the rotation of the torsion bar at the steering input end is not reflected to any great extent at the valve end because of the length of the torsion bar through which the twisting has to be transmitted, and it is for this reason that in conventional power-assisted steering assembly using a rotary hydraulic valve, the valve means is located on the same side of the assembly as the input shaft, as, for example, in our United Kingdom Patent Specification No. 1,470,975.

STATEMENT OF INVENTION AND ADVANTAGES

It is an object of the present invention to alleviate this limitation of rotary valves, and there is accordingly provided a power-assisted steering gear assembly comprising: a toothed driving member of tubular form which is axially rotatable; a toothed driven member whose teeth co-operate with those of the driving member for displacement of the driven member in response to rotation of the driving member to provide a steering output; fluid pressure-operated means associated with the driven member and adapted to provide power assistance to displacement of the driven member with rotation of the driving member; valve means adapted to control distribution of said fluid to the power assistance means and comprising two valve members which are co-axial with the driving member on the axial side of said driving member remote from a steering input and are axially rotatable relative to one another from a neutral condition to effect said control, a first of the valve members being coupled for rotation with the driving member and a second of the valve members being coupled for rotation with the steering input by way of a torsionally rigid tranmission member which extends axially through the tubular driving member, and wherein the transmission member is resiliently coupled to the driving member by spring means which biases the driving member and transmission member rotationally relative to each other and thereby rotationally biases the two valve members to said neutral condition.

By the present invention, the torsion bar of previously proposed rotary valves is replaced by the combination of a torsionally rigid transmission member and a resilient coupling. In order to alleviate overstressing of the spring means of the resilient coupling, a lost motion device may be provided between the steering input and the driving member and, while the lost motion device may take any one of the known forms of such devices, according to a preferred embodiment it comprises one or more roller members mounted for axial rotation with one of the steering input and the driving member and engaging in a circumferentially extended recess in the other of the steering input and the driving member. When the valve members are in their neutral condition, the steering input and driving member should be arranged with the or each roller member located centrally in its circumferentially extended recess, and adjustment means described hereinafter may be provided to ensure such arrangement.

The resilient coupling between the transmission member and the driving member is conveniently, but not essentially, located on the steering input side of the driving member, and, where the aforementioned lost motion device is provided, adjacent such device. The spring means may be in the form of a C-spring encircling the driving member and the ends of which engage suitable surfaces on the driving member and on a portion of the steering input which is rotationally rigid, at least in use, with the transmission member, when the valve members are in their neutral condition the C-spring is in a closed position and when the driving member and transmission member are rotated relative to one another to move the valve members out of their neutral condition, the C-spring is moved against its inherent bias out of the closed position. The suitable surfaces may be provided by pins fixed relative to the transmission member and the driving member, respectively.

As the valve means is located at a position remote from the steering input, difficulty may arise in centralising the valve means so that the valve members are in their neutral condition when the driving member and transmission member are in the relative rotational position to which they are biased by the spring means of the resilient coupling. This difficulty is alleviated by the provision of the aforementioned adjustment means by which the relative angular positions of the transmission member and driving member may be varied without effecting the resilient coupling. Preferably, the transmission member is rotationally rigid in use with a steering input member, as aforedescribed, which receives, for example, a steering shaft from the vehicle cab, but in order to centralise the valve members, the transmission member may be selectively angularly adjusted relative to the steering input member. Such adjustment may be provided by means of an olive and locking bush.

FIGURES IN THE DRAWINGS

One embodiment of a power-assisted steering gear assembly in accordance with the present invention will now be described by way of example only, with reference to the accompanying illustrative drawings, in which.

DETAILED DESCRIPTION OF THE DRAWINGS

Figure 1:
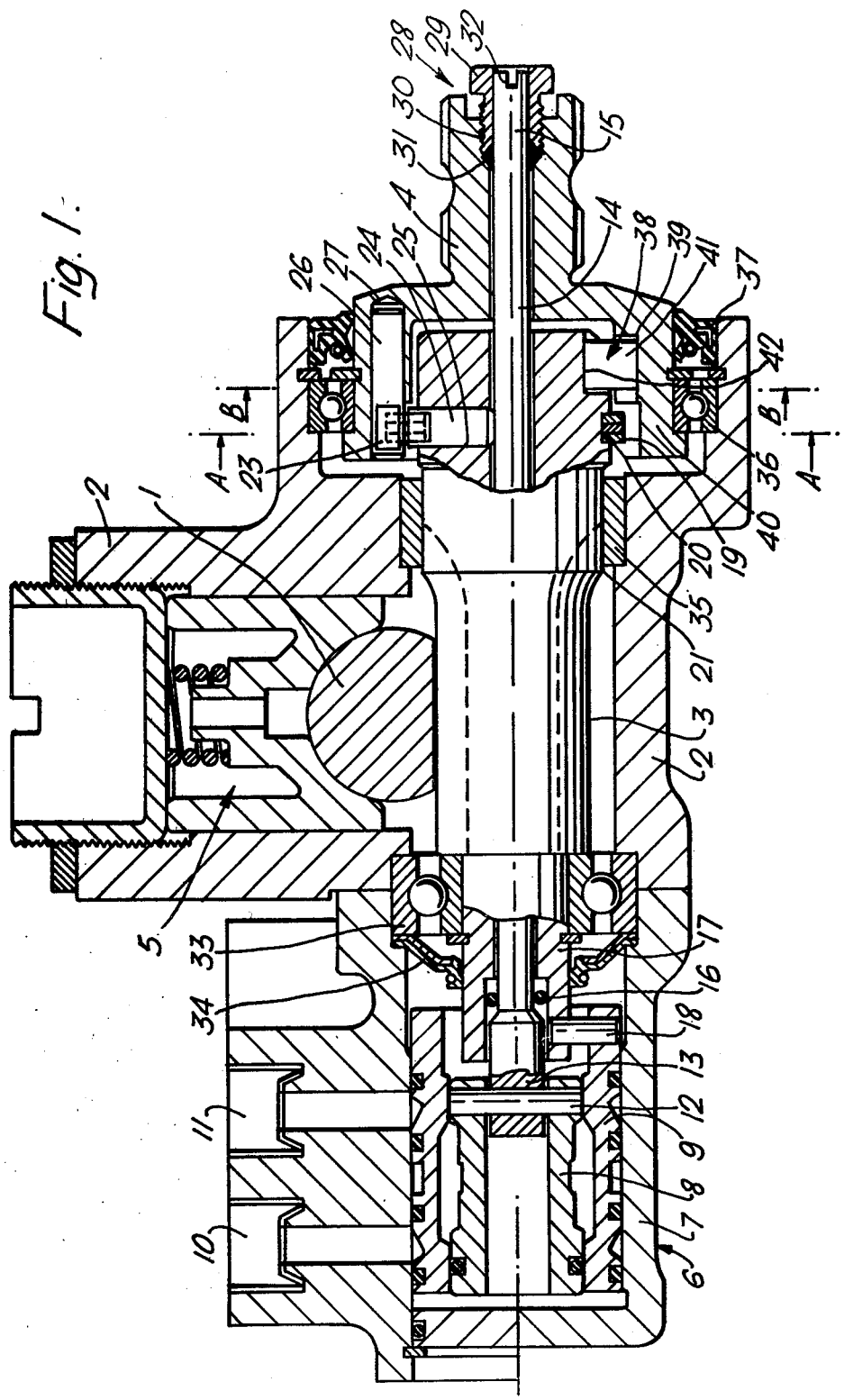
FIG. 1 is a cross-sectional view of the assembly generally along the pinion axis.

The steering gear assembly shown in FIG. 1 includes a longitudinally displaceable driven member in the form of a rack bar 1 which is located within a housing 2. Also located within the housing 2 is an axially rotatable driving member in the form of a pinion 3 whose teeth are in meshing engagement with teeth on the rack bar to transmit steering motion from a steering wheel (not shown) connected to a steering input mumber 4 of the assembly to wheels or other displacement members (not shown) connected in known manner to the rack bar 1. The rack bar 1 is urged into engagement with the pinion 3 by biasing means 5. Longitudinal displacement of the rack bar 1 by rotation of the input member 4 is intended to be power assisted by means (not shown) which is controlled by a valve 6 mounted on the housing 2. The steering input member 4 and valve 6 are axially aligned with the pinion 3 on opposite sides thereof.

Valve 6 comprises a valve housing 7 rigidly connected with the housing 2 by means, not shown, such as bolts and within which radially inner and outer valve members 8 and 9, respectively, are supported for axial rotation relative to each other and to the valve housing 7. Valve housing 7 has two ports 10 and 11 provided therein which are adapted to transmit the pressurised fluid to the power assistance means, usually to the opposite sides of a power assistance ram. A third port (not shown) is adapted to receive fluid under pressure from a source (not shown). In a preset angular relationship of the valve members 8 and 9 to each other, the neutral condition, fluid communication through the valve 6 to the ports 10 and 11 is open (i.e. the valve is open centre) so that fluid is circulated without effect through the valve 6 and the power assistance means. The valve members 8 and 9 will be in the neutral condition when power assistance is not needed, i.e. when there is no steering input to the assembly. Relative rotation of the valve members 8 and 9 out of the neutral condition opens fluid communication through the valve 6 between the appropriate port 10 or 11 to supply fluid under pressure to the power assistance means whilst closing the other port 11 or 10 respectively whereby power assistance is provided to the steering gear assembly. Rotary valves capable of performing this function are known per se and will not be described hereinafter in further detail. It will be appreciated however that while the valve 6 illustrated in FIG. 1 is of the open-centre type in which fluid flow through the valve in the neutral condition is free flowing, a closed valve could be used.

Relative rotation of the valve members 8 and 9 is provided for in the following manner. Inner valve member 8 is connected by means of a pin 12 with one end 13 of a torsionally rigid axially extending transmission member 14. The other end 15 of the transmission member 14 is rotationally rigidly coupled with the steering input member 4 whereby rotation of the steering wheel and thereby of the input member 4 is accurately reflected in the inner valve member 8. Pinion 3 is of tubular form and the transmission member 14 extends co-axially therethrough, with an O-ring seal 16 provided between an extension portion 17 of the pinion 3 and the transmission member 14 adjacent said one end 13. Between the ends 13 and 15, the transmission member 14 is of regular cross-section, preferably circular, and although shown as solid could be of tubular or other construction.

Outer valve member 9 is connected by means of a second pin 18 with the extension portion 17 of the pinion 3 whereby rotation of the pinion 3 is accurately reflected in the outer valve member 9. The pinion 3 and transmission member 14 are resiliently coupled to each other to provide the relative rotation of the valve members 8 and 9 out of their neutral condition on rotation of the steering input member 4 and to bias the valve members 8 and 9 into their neutral condition when steering motion at the input member 4 is stopped.

Figure 2:
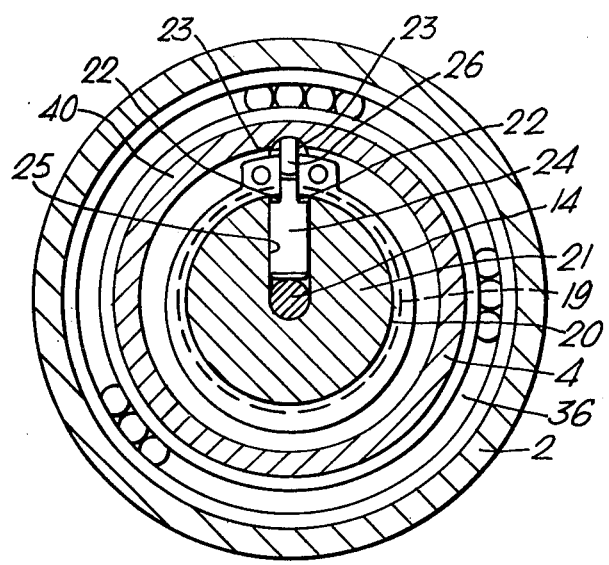
FIG. 2 is a sectional view taken on the line A—A of FIG. 1.

The biasing effect is provided by spring means in the form of a C-spring 19 which is located in an annular recess 20 in the pinion shaft 21 (see also FIG. 2). The C-spring 19 is shown in the form of three circlips arranged side-by-side but may take other forms. The ends of the C-spring 19 abut opposed flats 22 and 23 carried by both the pinion shaft 21 and the steering input member 4 with which the transmission member 14 is rotationally rigid, the opposed flats 22 carried by the pinion shaft 21 being provided on a pin 24 located in a radially extending bore 25 in the shaft 21, and the opposed flats 23 carried by the input member 4 being provided on a pin 26 located in an axially extending bore 27 in the member 4. Accordingly relative rotation of the pinion 3 and input member 4 causes the C-spring to open resiliently, and if the valve members 8 and 9 are set-up so that when the C-spring is closed (i.e. when the flats 22 and 23 are radially aligned), the valve members are in their neutral condition, the bias of the open C-spring will return the valve members to their neutral condition when there is no steering input motion. Overstressing of the C-spring is conveniently alleviated by a lost-motion device described hereinafter.

Such setting-up of the valve members 8 and 9 is provided for by adjustment means 28 by which the transmission member 14 may be angularly adjusted relative to the steering input member 4. The adjustment means 28 comprises a locking bush 29 which extends around the end 15 of the transmission member 14 and screw-threadedly engages a recess 30 in the axially outer end of the steering input member 4. Also provided in the recess 30 and extending around the transmission member 14 is an olive 31 and by screwing the bush 20 against the olive 31, the transmission member 14 is rigidly secured against rotation relative to the steering input member 4. When the bush 29 is slackened off, the transmission member 14 may be rotated, using the screwdriver slot 32, relative to the input member 4 to relatively rotate the valve members 8 and 9 without adjusting the condition of the C-spring 19. After adjustment the bush 29 should be re-tightened.

The pinion 3 is supported for rotation by a ball bearing assembly 33 at the valve-end thereof and the outer race of the assembly 33 engages both the main housing 2 and the valve housing 7. A fluid seal 34 is provided between the valve housing 7 and the extension portion 17 of the pinion. The pinion 3 is also supported for rotation by a plain bearing 35 between the pinion shaft 21 and the main housing 2, while the steering input member 4 is supported relative to the main housing 2 by a further ball bearing assembly 36. A seal 37 is provided between the housing 2 and input member 4.

Figure 3:
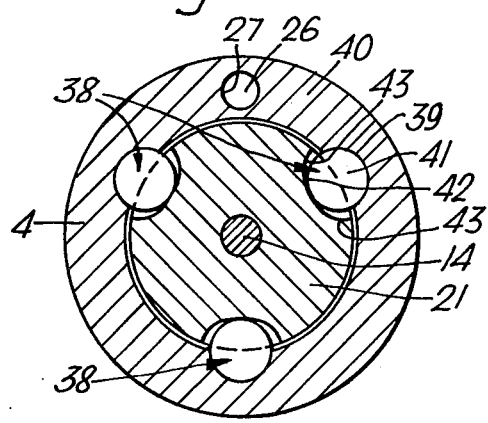
FIG. 3 is a sectional view taken on the line B—B of FIG. 1.

A roller arrangement 38 between the pinion shaft 21 and steering input member 4 may provide some support for the pinion 3 but has a main function to provide lost motion whereby the input member 4 may rotate a small amount before the pinion shaft 21 is caused to rotate. The roller arrangement 38 alleviates the possibility of the C-spring 19 being overstressed. The roller arrangement 38 (shown in FIGS. 1 and 3) comprises three circumferential-spaced, part-cylindrical recesses 39 in the radially inner wall of an annular flange 40 of the steering input member 4 and respective cylindrical rollers 41 located in the recesses 39. Provided in the radially outer wall of the pinion shaft 21 are three co-operating circumferentially-extended recesses 42 with which respective rollers 41 engage. The circumferentially-extended recesses 42 permit initial rotation of the steering input member 4 relative to the pinion shaft 21 until the rollers 41 engage the one or other of the endwalls 43 (in the direction of rotation of the input member 4) of the recesses 42. When the valve members 8 and 9 are properly set-up as aforedescribed, the rollers 41 should be located centrally in the recesses 42 when the valve members are in their neutral condition. For convenience of assembly the recesses 39 and 42 are formed as rebates which open axially in opposite directions.

I claim:

1. A power assisted steering gear assembly comprising a steering input, a toothed driving member of tubular form which is rotatable about its axis, a toothed driven member whose teeth cooperate with those of the driving member for displacement of the driven member in response to rotation of the driving member to provide a steering output, fluid pressure-operated means associated with the driven member and adapted to provide power assistance to displacement of the driven member with rotation of the driving member, rotary valve means adapted to control distribution of said fluid to the power assistance means and comprising two concentric relatively rotatable valve members which are coaxial with the driving member and located on the side of said driving member remote from the steering input, one of the valve members coupled for rotation with the driving member, a torsionally rigid transmission member extending axially through the driving member and drivingly coupling the other of the valve members with the steering input, and spring means biasing the driving member and the steering input rotationally relative to each other and rotationally biasing the two valve members to a neutral condition.

2. An assembly according to claim 1 wherein said spring means is stressed upon relative movement of said driving member and said steering input, and further including limit means for limiting the stressing of the spring means and located between the steering input and driving member.

3. An assembly according to claim 2 wherein said limit means includes one or more abutment members fixed relative to one of the steering input and the driving member and a respective circumferentially extending recess in the other of the steering input and driving member for receiving an associated abutment member, each said recess including circumferentially spaced end surface portions, whereby each abutment member engages one of the circumferential end surface portions of its associated recess after a predetermined amount of relative movement between the driving member and the steering input so that continued rotation of the steering input results in corresponding rotation of the driving member.

4. An assembly according to claim 1 including locking means for drivingly coupling the transmission member with the steering input and which is selectively releasable to enable angular adjustment of the transmission member relative to the steering input and thereby adjustment of the relative angular position of the valve members.

5. An assembly according to claim 1 in which the spring means is located on the steering input side of said driving member.

6. An assembly according to claim 1 wherein said spring means comprises a C-shaped spring, said C-shaped spring encircling the driving member and having opposed end faces, each end face engaging a respective set of two sets of surfaces, each set of surfaces comprising two surfaces that are fixed with the driving member and the steering input, respectively.

7. An assembly according to claim 6 further including two pins, a first of which is axially extending and is carried by the steering input and a second of which is radially extending and carried by the driving member, each said pin having opposed sides, and the surface in each set that is fixed to the steering input is formed on a respective one of the opposed sides of the axially extending pin and the surface in each set that is fixed to the driving member is formed on a respective one of the opposed sides of the radially extending pin.

8. An assembly according to claim 6 wherein the driving member includes a peripheral recess in which the C-spring is located.

* * * * *